(12) United States Patent
Adikari et al.

(10) Patent No.: US 9,417,951 B2
(45) Date of Patent: Aug. 16, 2016

(54) METHOD AND APPARATUS FOR CIPHER FAULT DETECTION

(71) Applicant: Synopsys, Inc., Mountain View, CA (US)

(72) Inventors: A. A. Jithra Adikari, Ottawa (CA); Jean-Pierre Thibault, Ottawa (CA); Mike Borza, Ottawa (JP)

(73) Assignee: Synopsys, Inc., Mountain View, CA (US)

(*) Notice: Subject to any disclaimer, the term of this patent is extended or adjusted under 35 U.S.C. 154(b) by 181 days.

(21) Appl. No.: 14/136,901

(22) Filed: Dec. 20, 2013

(65) Prior Publication Data
US 2015/0178146 A1    Jun. 25, 2015

(51) Int. Cl.
| | |
|---|---|
| G06F 11/00 | (2006.01) |
| H03M 13/00 | (2006.01) |
| H04L 1/00 | (2006.01) |
| G06F 11/10 | (2006.01) |
| H04L 9/06 | (2006.01) |

(52) U.S. Cl.
CPC .............. *G06F 11/10* (2013.01); *H04L 9/0631* (2013.01); *H04L 2209/34* (2013.01)

(58) Field of Classification Search
CPC . G06F 11/10; G06F 11/0766; G06F 11/3065; H04L 9/036; H04L 9/004; H04L 9/0631; H04L 9/0618; H04L 9/28; H04L 12/40176; H04L 49/555
See application file for complete search history.

(56) References Cited

U.S. PATENT DOCUMENTS

| | | | |
|---|---|---|---|
| 8,130,946 B2 * | 3/2012 | De Mare | 380/28 |
| 8,489,897 B2 * | 7/2013 | Trichina | 713/190 |
| 2009/0132802 A1 * | 5/2009 | Amann et al. | 713/150 |

OTHER PUBLICATIONS

International Search Report, PCT/IB2014/066491, 2 pages, date of mailing Mar. 12, 2015.
International Written Opinion, PCT/IB2014/066491, 7 pages, date of mailing Mar. 12, 2015.
"An FPGA Implementation of AES with Fault Analysis Countermeasures", Kamal et al., 2009 International Conference on Microelectronics (ICM), pp. 217-220, publisher: IEEE, Dec. 19-22, 2009, Print ISBN:978-1-4244-5814-1 *entire document*.
"A round level approach to fault detection in PP-2 symmetric block cipher", Idzikowska, The 7th International Conference for Internet Technology and Secured Transactions (ICITST-2012), pp. 416-419, publisher: IEEE, Dec. 10-12, 2012, Print ISBN 978-1-4673-5325-0 *entire document*.

(Continued)

*Primary Examiner* — Shelly A Chase
(74) *Attorney, Agent, or Firm* — Jaquez Land Greenhaus LLP; Bruce Greenhaus, Esq.

(57) ABSTRACT

What is disclosed is an embodiment of a method for ciphering data. Data is provided for ciphering thereof. The data is ciphered in a plurality of steps. For each step, an encoding for error detection of the data for being processed within the step is determined. An output error detection encoding for the step is determined. The data for being processed within the round is processed to provide output error detection encoding which is then verified against the determined output error detection encoding. When the output error detection encoding is other than same as the determined error detection encoding, providing a signal indicative of an error within the cipher process.

30 Claims, 11 Drawing Sheets

(56) References Cited

OTHER PUBLICATIONS

"Design of LDPC-based Error Correcting Cipher", Su et al., IET $2^{nd}$ International Conference on Wireless Mobile and Multimedia Networks (ICWMMN 2008), pp. 470-474, publisher: IET, Oct. 12-15, 2008 *entire document*.

Mozaffari-Kermani et al., "Concurrent Structure-Independent Fault Detection Schemes for the Advanced Encryption Standard," IEEE Transactions on Computers, vol. 59, No. 5, pp. 608-622, May 2010.

Karri et al., "Fault-Based Side-Channel Cryptanalysis Tolerant Rijndael Symmetric Block Cipher Architecture," Proceedings of the 2001 IEEE International Symposium on Defect and Fault Tolerance in VLSI Systems (DFT '01), 9 pages, 2001.

Mozaffari-Kermani et al., "A Low-Power High-Performance Concurrent Fault Detection Approach for the Composite Field S-Box and Inverse S-Box," IEEE Transactions on Computers, vol. 60, No. 9, pp. 1327-1340, Sep. 2011.

Yen et al., "Simple Error Detection Methods for Hardware Implementation of Advanced Encryption Standard," IEEE Transactions on Computers, vol. 55, No. 6, pp. 720-731, Jun. 2006.

\* cited by examiner

METHOD AND APPARATUS FOR CIPHER FAULT DETECTION

The present disclosure relates to data security and more particularly to systems and methods of data obfuscation.

BRIEF SUMMARY

In accordance with an aspect of at least one embodiment of the invention there is provided a method comprising: providing data for ciphering thereof; ciphering the data in a plurality of cipher rounds, each round comprising: determining an encoding for error detection of data for being processed within the round, determining an output error detection encoding for the round, processing the data for being processed within the round to provide output error detection encoding, verifying the output error detection encoding against the determined output error detection encoding, and when the output error detection encoding is other than same as the determined error detection encoding, providing a signal indicative of an error within the cipher process.

In some embodiments the method comprises logging at least one of a presence of an error and an absence of an error during a round of the cipher process.

In some embodiments the method comprises when an error is detected, repeating the cipher process.

In some embodiments the method comprises when an error is detected, repeating the round in which the error is detected.

In some embodiments error detection encoding comprises at least a parity symbol.

In some embodiments the at least a parity symbol comprises a multi-bit parity code.

In some embodiments the at least a parity symbol comprises a mix column parity.

In some embodiments the at least a parity symbol comprises a checksum.

In some embodiments the at least a parity symbol comprises an S-box parity.

In some embodiments the output error detection encoding is determined by determining at least a parity symbol relating to output data from processing the data for being processed within the round.

In accordance with an aspect of at least one embodiment of the invention there is provided a method comprising: providing first data for ciphering thereof; performing a ciphering process on the first data, the ciphering process comprising a plurality of intermediate steps; calculating at least one parity symbols for at least one intermediate step; and based on the calculated at least one parity symbol, verifying an output value of the at least one intermediate step to detect an error within the output value.

In some embodiments the method comprises repeating the at least one intermediate step until an error within the output value is other than detected.

In some embodiments the method comprises when an error is detected within the output value relating to an intermediate step, repeating the ciphering process.

In some embodiments the method comprises repeating the ciphering process until an error within the output value is other than detected.

In some embodiments the method comprises logging each detected error within an error log file.

In some embodiments the method comprises when the log file is indicative of a detected error within an output value relating to an intermediate step, repeating the ciphering process.

In some embodiments the method comprises calculating at least one other parity symbol for at least one other intermediate step; and based on the calculated at least one other parity symbol, verifying a second output value of the at least one other intermediate step to detect an error within the second output value.

In some embodiments calculating at least one parity symbol for at least one intermediate step comprises, calculating at least one parity symbol for each intermediate step within the ciphering process; and wherein verifying comprises verifying an output value of each intermediate step to detect an error within said output value.

In some embodiments the at least a parity symbol comprises a multi-bit parity code.

In some embodiments the multi-bit parity code supports error detection and error correction comprises automatically correcting an error in the output value based on the multi-bit parity and the output value.

In some embodiments the at least a parity symbol comprises a mix column parity.

In some embodiments the at least a parity symbol comprises a checksum.

In some embodiments the at least a parity symbol comprises an S-box parity.

In accordance with an aspect of at least one embodiment of the invention there is provided a method comprising: providing external data for ciphering thereof; performing a ciphering process on the external data, the ciphering process comprising a plurality of intermediate steps comprising: providing first data for processing; calculating a result of performing an intermediate step on the first data; performing an inverse function on the result of the intermediate step; and comparing a result of the inverse function to the first data to detect an error in processing of the first data; and when the first data and the result of the inverse function are indicative of an error, performing one of logging the error and repeating calculating a result of performing the intermediate step on the first data.

In some embodiments comparing is performed by comparing at least a parity symbol derived based on the first data and at least a parity symbol based on the result of the inverse function.

In some embodiments performing a ciphering process on the external data comprises: providing second data for processing, the second data a result of the intermediate step performed on the first data: calculating a result of performing a second intermediate step on the second data; performing a second inverse function on the result of the second intermediate step; and comparing a result of the second inverse function to the second data to detect an error in processing of the second data; and when the second data and the result of the second inverse function are indicative of an error, performing one of logging the error and repeating calculating a result of performing the second intermediate step on the second data.

In accordance with an aspect of at least one embodiment of the invention there is provided a method comprising: providing first data for ciphering thereof; performing a ciphering process on the first data, the ciphering process comprising a plurality of intermediate steps; calculating at least one error detection and correction code for at least one intermediate step; and based on the calculated at least one error detection and correction code, verifying an output value of the at least one intermediate step to correct an error within the output value, the error corrected solely in dependence upon the output value and the error detection and correction code.

In some embodiments the at least one error detection and correction code comprises a multi-bit parity code.

In some embodiments the at least one error detection and correction code comprises a mix column parity.

In some embodiments the at least one error detection and correction code comprises a checksum.

In some embodiments the at least one error detection and correction code comprises an S-box parity.

In some embodiments the at least one error detection and correction code comprises one of a turbocode and a hypercode.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
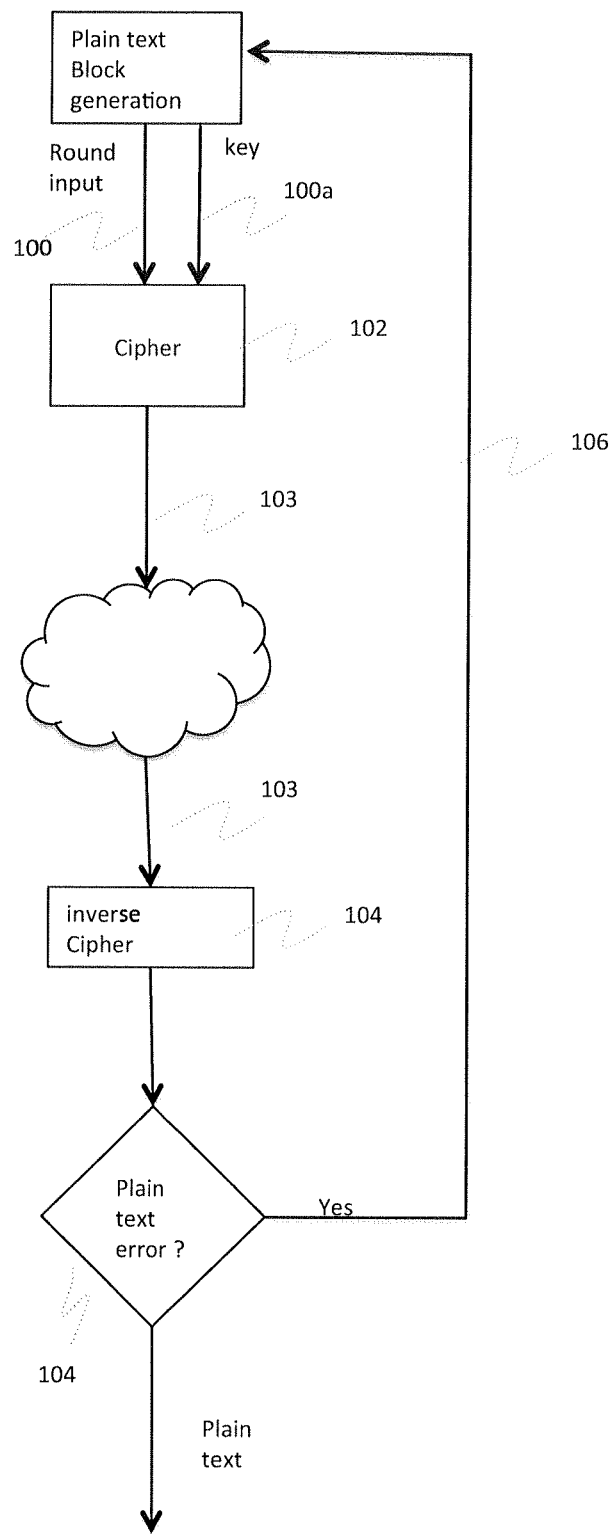
FIG. 1a is a block diagram of a redundant cipher implementation.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Cryptographic systems aim to provide strong guarantees about data security such as confidentiality, data origin integrity. This is achieved relying on secret data and combining the secret data with data to be protected using strong mathematical processes; typically the mathematical processes are reversible, but this is not always the case. One common technique to implement a cryptographic system is referred to as a block cipher.

When using a block cipher, data is encrypted in a sequence of sub-processes referred to as rounds. Each round is a sub-process onto itself. When using a cryptographic system employing a block cipher to encode data at a transmitting end—encrypt the data, there is a risk of data corruption. When data corruption occurs within the process, it prevents the encrypted data from being decoded at a receiving end. Data corruption sometimes happens during a round within the secret data—the key—and sometimes happens within the data to be protected.

Referring to FIG. 1a, a round input value 100 in the form of plain text—input data for the first round—is fed to a block cipher 102 for generating a ciphertext 103 therefrom. The ciphertext 103 is transmitted to a receiving end to be decrypted by a reverse cipher process 104. The reverse cypher process 104 may determine that the encrypted data received at the receiving end is corrupted and cannot be converted to plain text 105 using the reverse cypher process 104. Generally, as with other communication errors, the receiving end makes a request 106 for retransmission of the block of encrypted data that was corrupted, which incurs delays, extra processing and potential additional corruption issues.

Figure 1B:
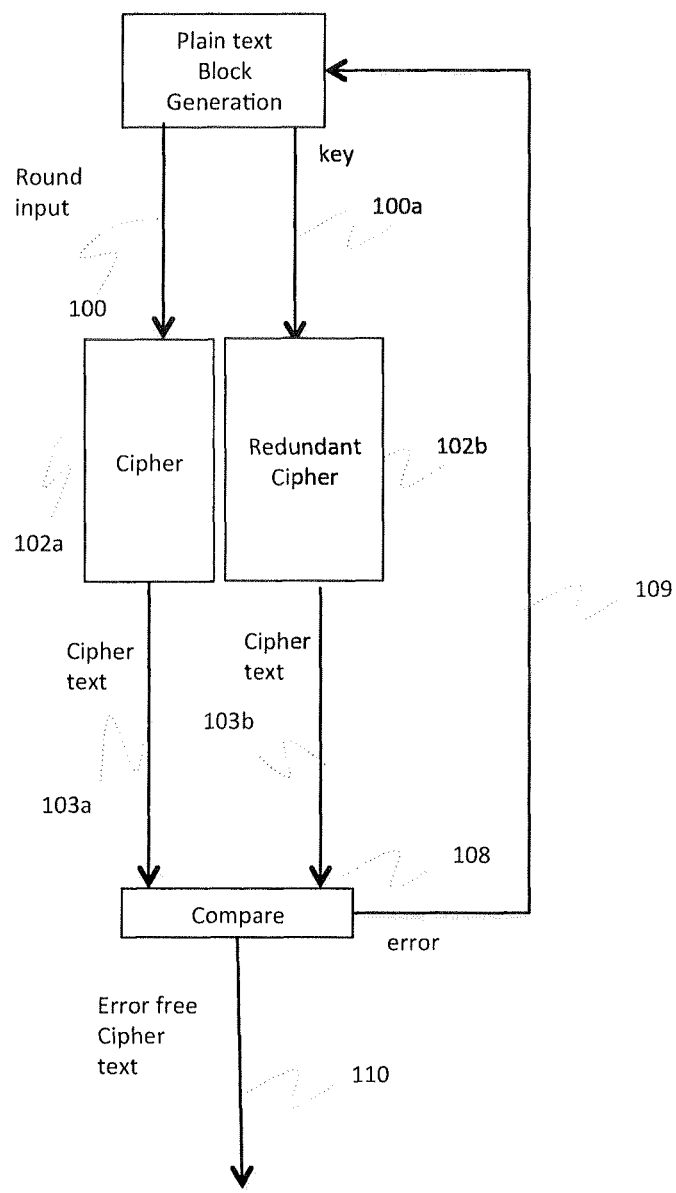
FIG. 1b is a block diagram of another redundant cipher implementation

Referring to FIG. 1b, shown is a simplified block diagram of a method for addressing data corruption. The method of FIG. 1b provides same plain text 100 to each of two duplicate cipher processes 102a and 102b at a transmitting end. This results in two cypher text versions 103a and 103b of the plain text data 100, which are processed at the transmitter, for example, by comparing the two data at 108. When the cypher text versions 103a and 103b do not match, an error is generated at 109 and the process is re-initiated until no error is detected 110. When the round input or plain text 100 is fed to two different block ciphers 102a, 102b in parallel, encryption circuitry is significantly increased. When it performed in series, the encryption process is significantly slowed down. The process is repeated until no error is detected 110 at which point the ciphertext is sent to a receiving end.

A more efficient fault detection that does not require duplicating the entire circuit would be advantageous.

Figure 2:
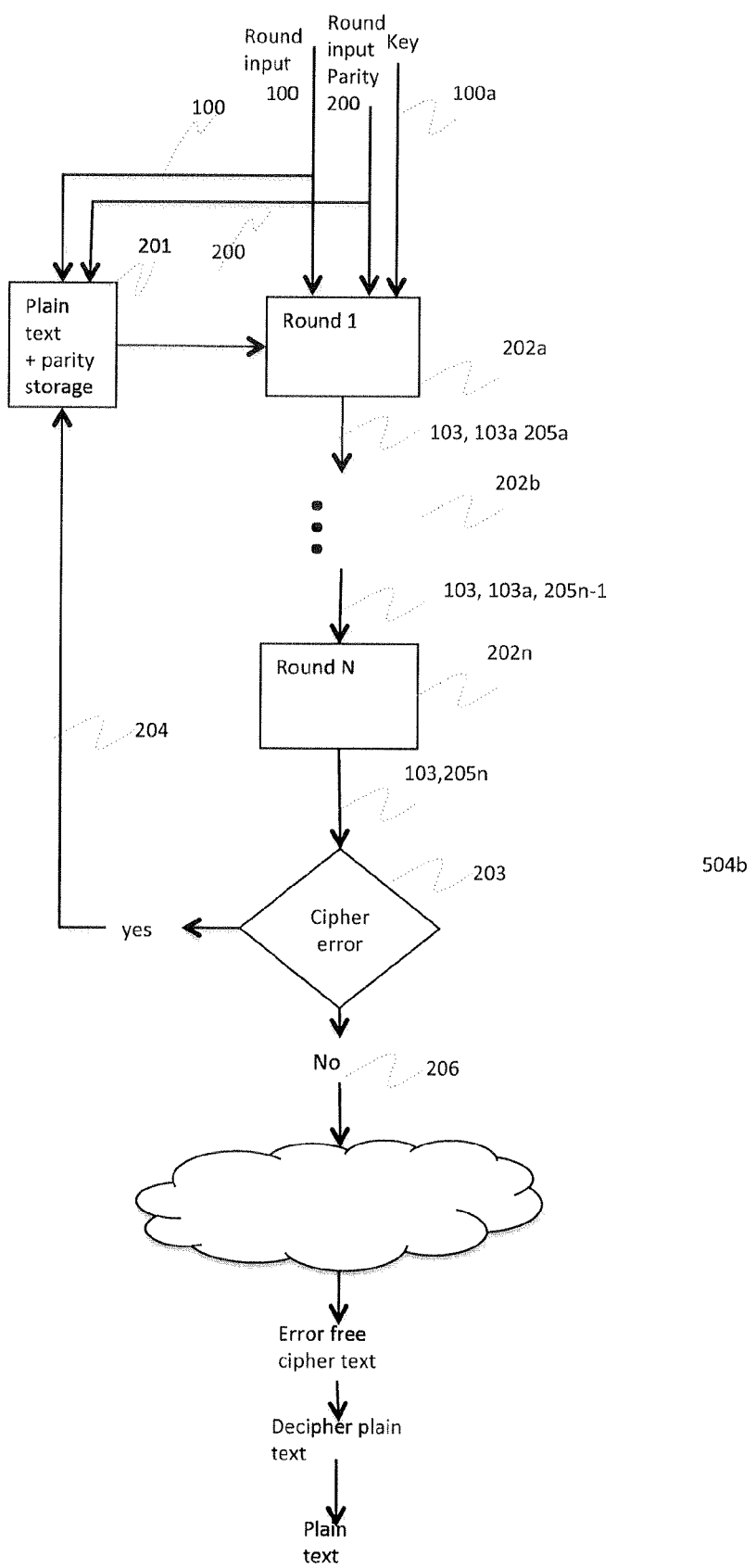
FIG. 2 is a diagram showing use of an error log to correct a cipher prior to transmission thereof.

FIG. 2 shows a simplified block diagram of an exemplary implementation of a cipher fault detection process obviating duplicate circuits for process redundancy. The cipher process supports a plurality of different key sizes. In this embodiment, cipher faults, errors in processing of a cipher round and/or data corruption errors, are detected as part of the cipher process using parities calculated within different functional blocs of the cipher. Historically, parities detect byte-level single bit errors—an odd number of bit errors; since their first implementation, parity has been expanded to detect multi-bit errors and are used in numerous coding techniques. Optionally, another multi-bit checksum or cyclic redundancy check is used to detect errors. A round input value 100 comprises plain text for a first round 202a and partially ciphered text for subsequent rounds 202b . . . 202n. A round output value 103 comprises partially ciphered text 205a . . . 205n–1 or ciphertext from a final round 205n. Except for output data from the final round, round output values become round input values of a follow on round.

Parity for the round input value 100a is fed into the first round of cipher process 104 and stored in temporary storage 201 along with the round input value 200. At an end of round X 202x, round output value 103, parity bit for the round output value 103a, and an error log 205x is provided to a subsequent round, typically a round immediately subsequent round X. At an end of round N, the last round, the error log is checked 203 to determine whether an error occurred within the cipher process. If the cipher process is other than error-free 204, the cipher process is re-started until the cipher process result is error free 206, in which case the ciphertext is transmitted to a receiving end for decryption.

Figure 2A:
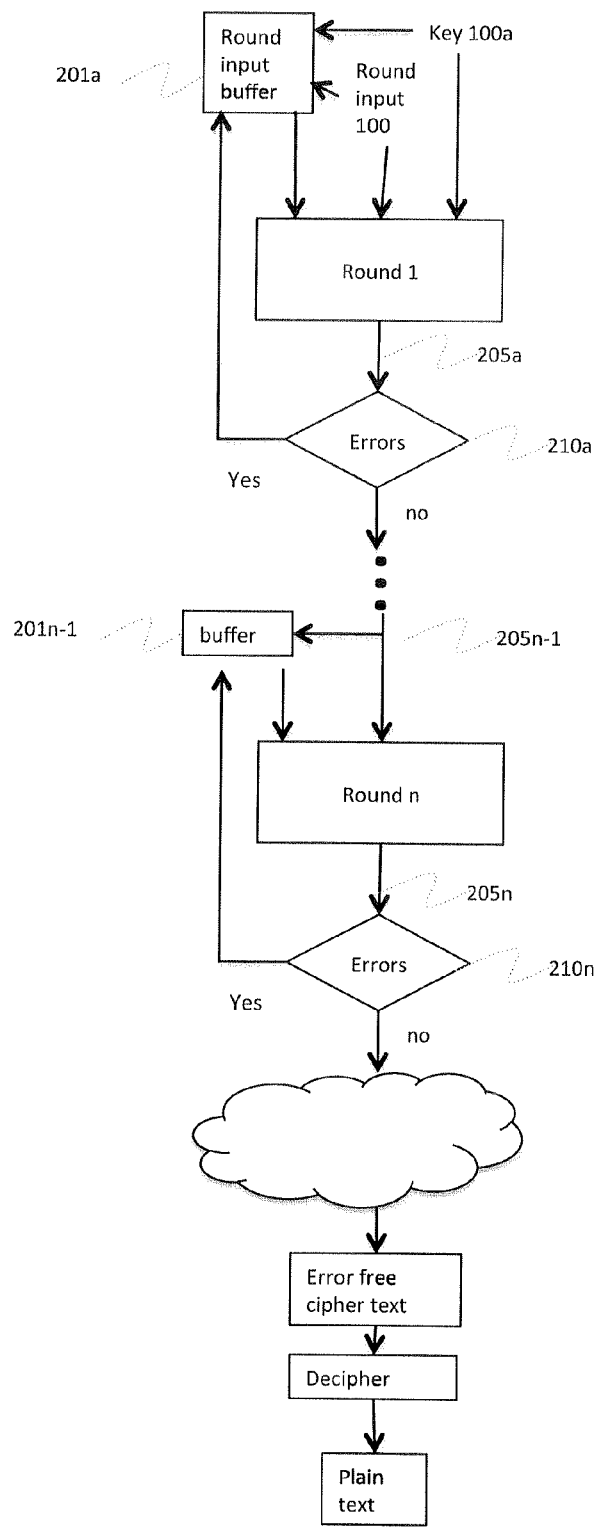
FIG. 2a is a simplified diagram showing correction of a cipher after each round prior to transmission to a receiving end.

FIG. 2a shows a simplified block diagram of another embodiment where error checking 210a . . . 210n is performed immediately after each round and only a round that introduced an error is repeated using the information stored in temporary buffers 201a . . . 201n. Alternatively, error checking 210a . . . 210n is performed immediately after each round allowing a cipher process to be terminated and re-started before it has reached its conclusion—produced ciphertext—when errors are detected.

Figure 3:
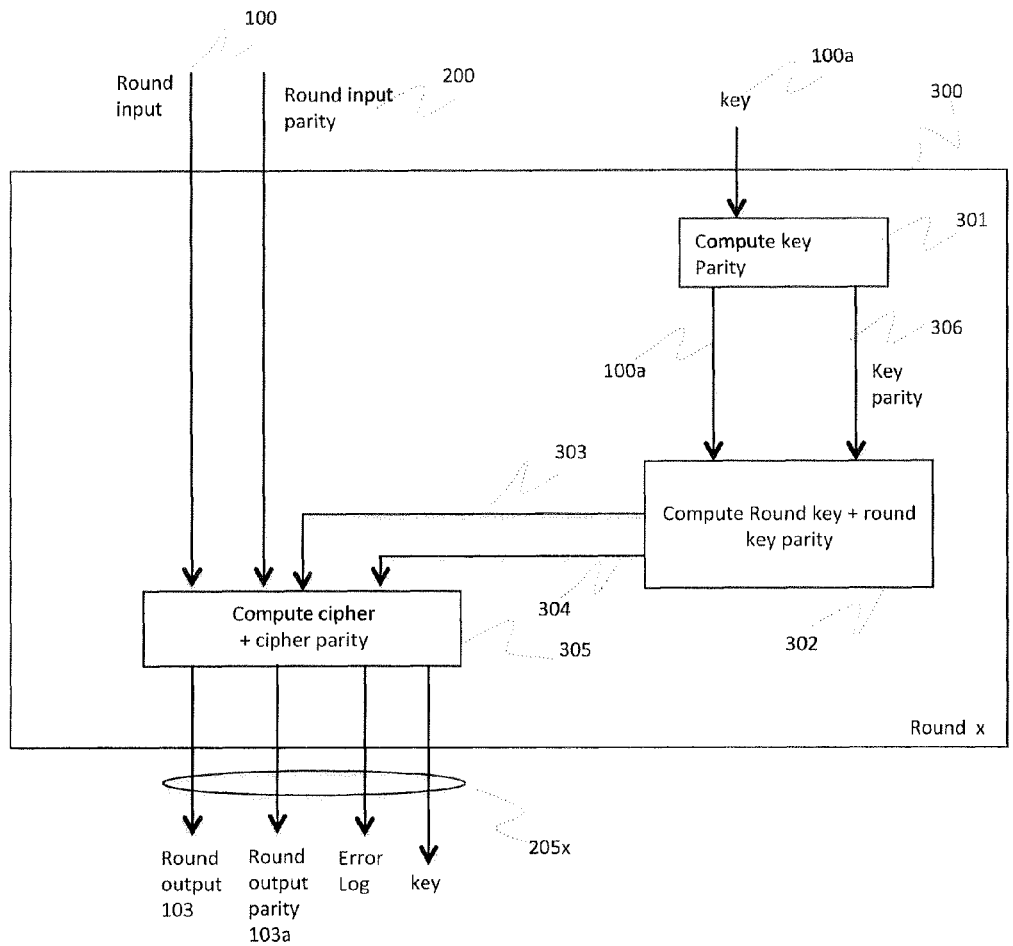
FIG. 3 is a simplified diagram showing addition of parities to a standard cipher process in order to detect errors and generate an error log.

FIG. 3 shows in block diagram a high level view of an embodiment of a round. A key 100a in the form of the secret key for a first round or a round key for other rounds is used to compute 301 the key parity 306. The key 100a and key parity, are used to compute 302 the round key 303 and round key parity 304 as described below. The round input value 100, round input parity 200, along with the round key 303 and round key parity 304 are used to compute 305 the round output value and round output parity for the round as described below. An error log 205x is provided to indicate if an error was detected during a. Optionally, the log logs errors and their associated round. Alternatively, the log merely indicates that an error has occurred. For example, in its simplest form, the error log is a flag value indicating a presence or absence of an error within the cipher processing.

Figure 4:
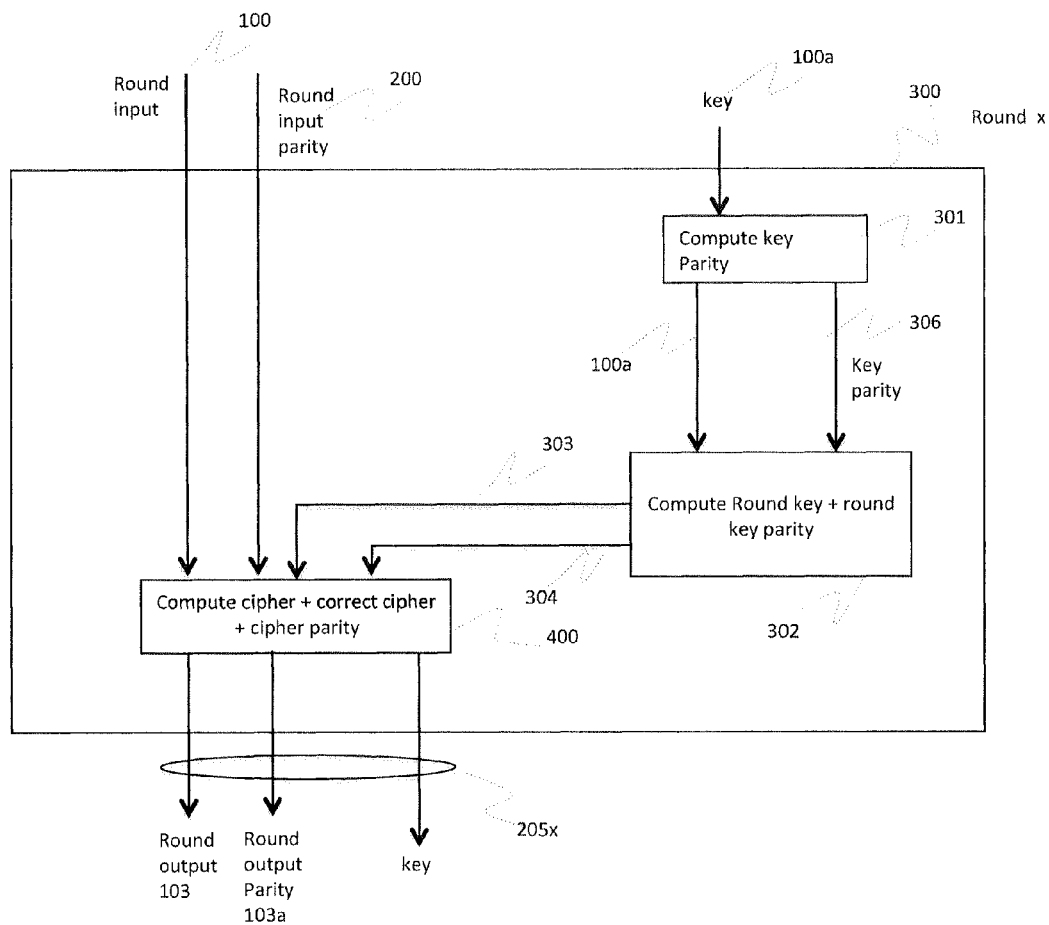
FIG. 4 is a simplified diagram showing how a cipher is corrected when an error is detected with sufficient coding to allow for error correction.

FIG. 4 is a simplified block diagram of a process similar to the process of FIG. 3 wherein error correction techniques are applied 400 to ciphertext when errors are detected in an attempt to make the ciphered data error free. Error correction techniques are well known and are often associated with error detection techniques. Codes are often evaluated based on their error detecting and correcting ability, where more powerful codes detect and allow for correction of a greater number of corrupt bits. When error detection/correction techniques are applied, the resulting process often obviates some or all repetition of cipher rounds.

The general idea for achieving error detection and correction is to add some redundancy, some extra data, to a message, which receivers can use to check consistency of the delivered message and to recover data determined to be corrupted. Error-detection and correction schemes can be either systematic or non-systematic: In a systematic scheme, the transmitter sends the original data, and attaches a fixed number of check bits or parity, which are derived from the data bits by some deterministic process. In a system that uses a non-systematic code, the original message is transformed into an encoded message that has at least as many bits as the original message.

An error-detection and correction process may be combined with a system for retransmissions of erroneous data. To form a hybrid automatic repeat request (HARQ) system, which is a combination of ARQ and forward error-correction coding. Thus, error correction coding is usable to detect and correct many common errors, but when errors exceed the ability of the system, processing of the data is repeated. This allows a forward error correction code that consumes limited processing while supporting error free operation. A balance between performance of the circuit in the absence of errors and performance of the circuit in the presence of errors is typically part of the design process.

Figure 5:
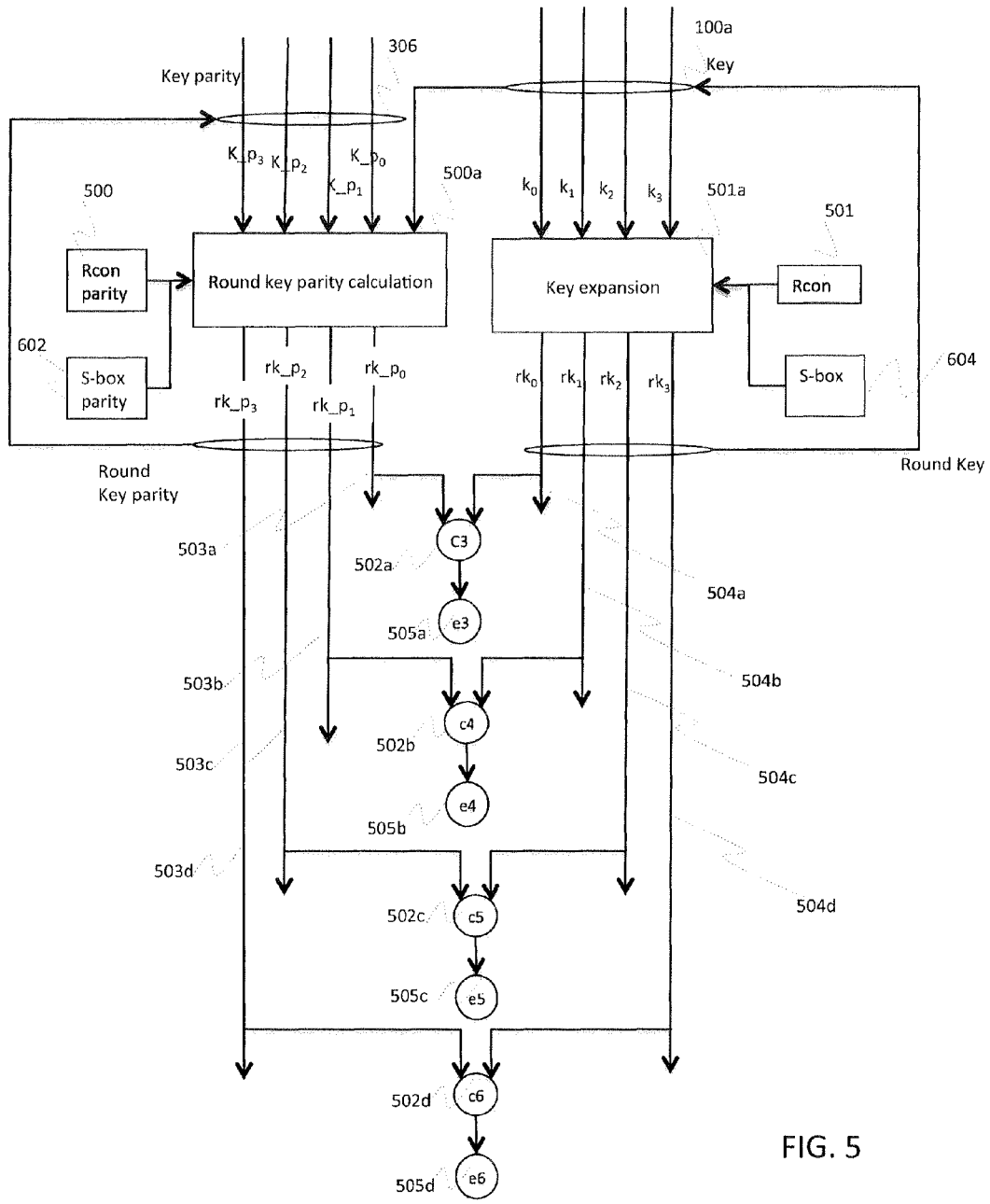
FIG. 5 is a simplified diagram showing addition of parities to a standard key expansion process in order to detect errors.

FIG. 5 shows a simplified block diagram for a process forming an embodiment. Here, the process relies upon a key, for example 128-bit key, for detecting errors during a key expansion sub-module. Shown, one parity symbol is computed for each 32-bit block of key 306 and at an intermediate step 500a, a round key parity 503a . . . 503d is computed. The round key parity 503a . . . 503d is then checked 502a . . . 502d against parity for a computed round key 504a . . . 504d to detect errors 505a . . . 505d. For example, the parity for the round key is calculated using a lookup table 500 which provides a parity for standard Round Constant values (Rcon) 501 as follows:

| Rcon value | Rcon parity |
|---|---|
| 01 | 1 |
| 02 | 1 |
| 04 | 1 |
| 08 | 1 |
| 10 | 1 |
| 20 | 1 |
| 40 | 1 |
| 80 | 1 |
| 1C | 0 |
| 36 | 0 |

To calculate the round key parity 500a, $rk\_p_1$=S-box parity$\oplus$Rcon parity$\oplus k_1$
$rk\_p_2$=S-box parity$\oplus$Rcon parity$\oplus k_2$
$rk\_p_3$=S-box parity$\oplus$Rcon parity$\oplus k_3$
$rk\_p_4$=S-box parity$\oplus$Rcon parity$\oplus k_4$ The key expansion function 501a is done as indicated in NIST, *FIPS*197—*Advanced encryption standard*, November 2001. Then the round key and its associated parity is verified for errors 502a . . . 502d and when there is a mismatch with the parity, an error 505a . . . 505d is logged.

Figure 6:
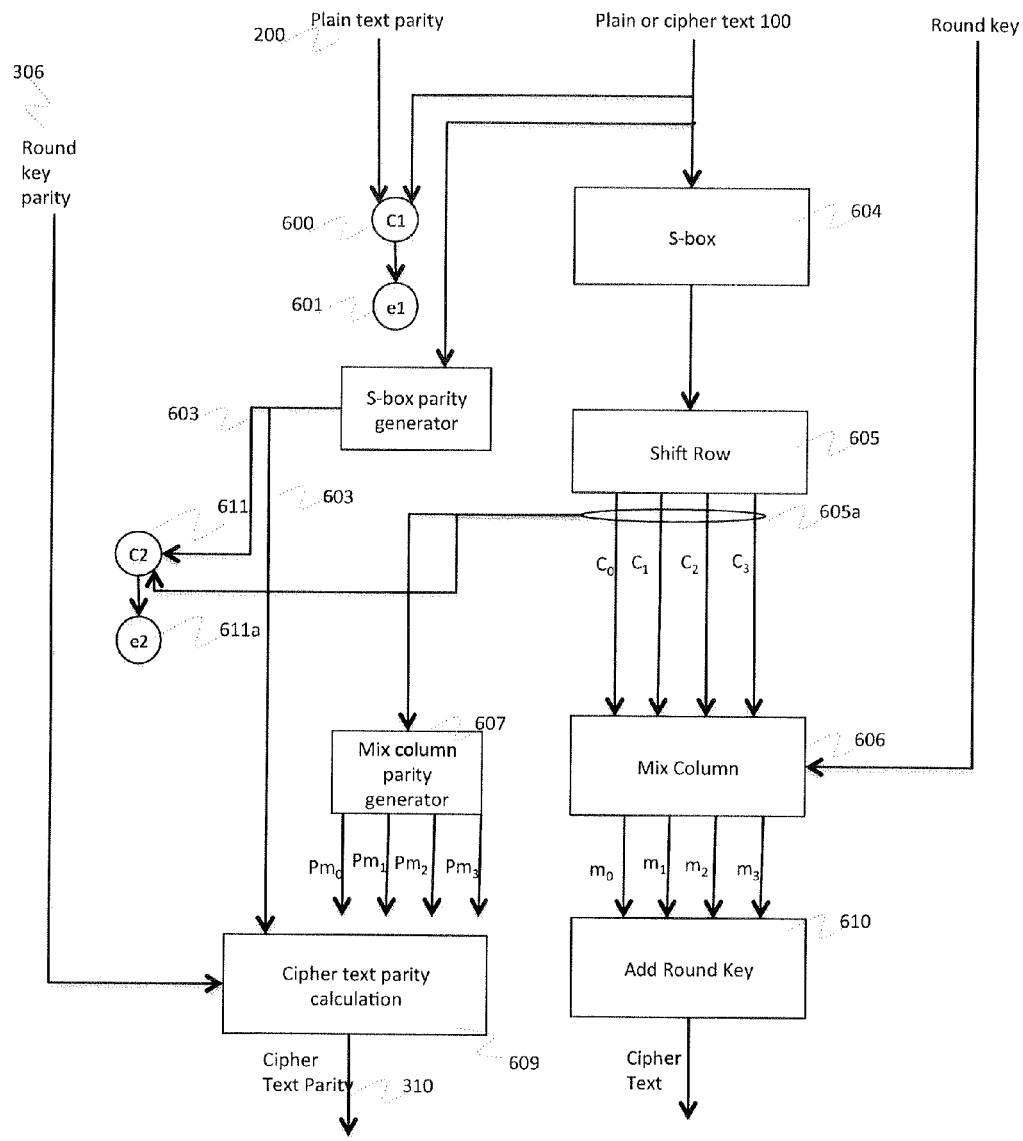
FIG. 6 is a simplified diagram showing addition of parities to a standard encryption process in order to detect errors occurring during said process.

FIG. 6 shows a process for detecting errors at different ciphering sub-modules The round input value 100 and round input parity 200 are verified at an outset of a round 600 and an error 601 is generated when an error is detected in the round input value. Of course, verifying round input data and parity values is also possible at an end of a round.

The plain text is processed with standard S-box function 604 as described in NIST, *FIPS*197—*Advanced encryption standard*, November 2001. An S-box parity look up table 602 is pre-computed based a non-linear substitution table (S-box) (refer to FIG. 7 of NIST, *FIPS*197—*Advanced encryption standard*, November 2001). An example table is as follows:

| Subbyte | S-box Parity |
|---|---|
| 9C | 0 |
| Cb | 1 |

At another intermediate step S-box parity 603 is XOR 611 with the output value 605a of standard shift-row operation 605 to detect an error 611a.

A parity is also computed at another sub-module as part of the mix-column transformation. The calculation related to parity includes two stages for parity generation, a mix-column operation and an inverse mix-column operation. Mix-column operation 606 (see equation 5.6 of NIST, *FIPS*197—*Advanced encryption standard*, November 2001) is written as:

$$\begin{bmatrix} m_0 \\ m_1 \\ m_2 \\ m_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} C_0 \\ C_1 \\ C_2 \\ C_3 \end{bmatrix}$$

The mix-column parity generator is used to calculate parities 607 of $m_0$, $m_1$, $m_2$, $m_3$. Consider the bit representation of byte $C=c_7, c_6, c_5, c_4, c_3, c_2, c_1, c_0$. Assuming $P_{C0}$, $P_{C1}$, $P_{C2}$, $P_{C3}$, are parities of bytes $C_0$, $C_1$, $C_2$, $C_3$ and the parity of C is $P_C$, then $[02]C=c_6\, c_5\, c_4[c_3\oplus c_7][c_2\oplus c_7]c_1[c_0\oplus c_7]c_7$ The parity of $[02]C=[P_C\oplus c_7]$ Now $[03]C=[02]C\oplus C=[c_6\oplus c_7][c_6\oplus c_5][c_5\oplus c_4]$
$[c_4\oplus c_3\oplus c_7][c_3\oplus c_7][c_3\oplus c_2\oplus c_7][c_1\oplus c_2]$
$[c_1\oplus c_0\oplus c_7][c_0\oplus c_7]$ (1)

The parity of $[03]C=$(parity of $[02]C)\oplus P_C=P_C\oplus c_7\oplus P_C=c_7$

The parity 607 of $m_0$, $m_1$, $m_2$, $m_3$, is computed as follows:

$P_{m0}=P_{C0}\oplus P_{C2}\oplus P_{C3}\oplus MSb_{C0}\oplus MSb_{C1}$
$P_{m1}=P_{C0}\oplus P_{C1}\oplus P_{C3}\oplus MSb_{C1}\oplus MSb_{C2}$
$P_{m2}=P_{C0}\oplus P_{C1}\oplus P_{C2}\oplus Msb_{C2}\oplus MSb_{C3}$
$P_{m3}=P_{C1}\oplus P_{C2}\oplus P_{C3}\oplus MSb_{C3}\oplus MSb_{C0}$ Where $MSb_{Cx}$ represents the most significant bit.

Then $P_{m0}$, $P_{m1}$, $P_{m2}$, $P_{m3}$, 608 are used to generate at 609 the round output parity 310 by performing a bytewise XOR function between the round key parity 306 and each $P_{m0}$, $P_{m1}$, $P_{m2}$, $P_{m3}$. The round output value is computed as per the standard procedure 610 set out in NIST, *FIPS197—Advanced encryption standard*, November 2001.

Figure 7:
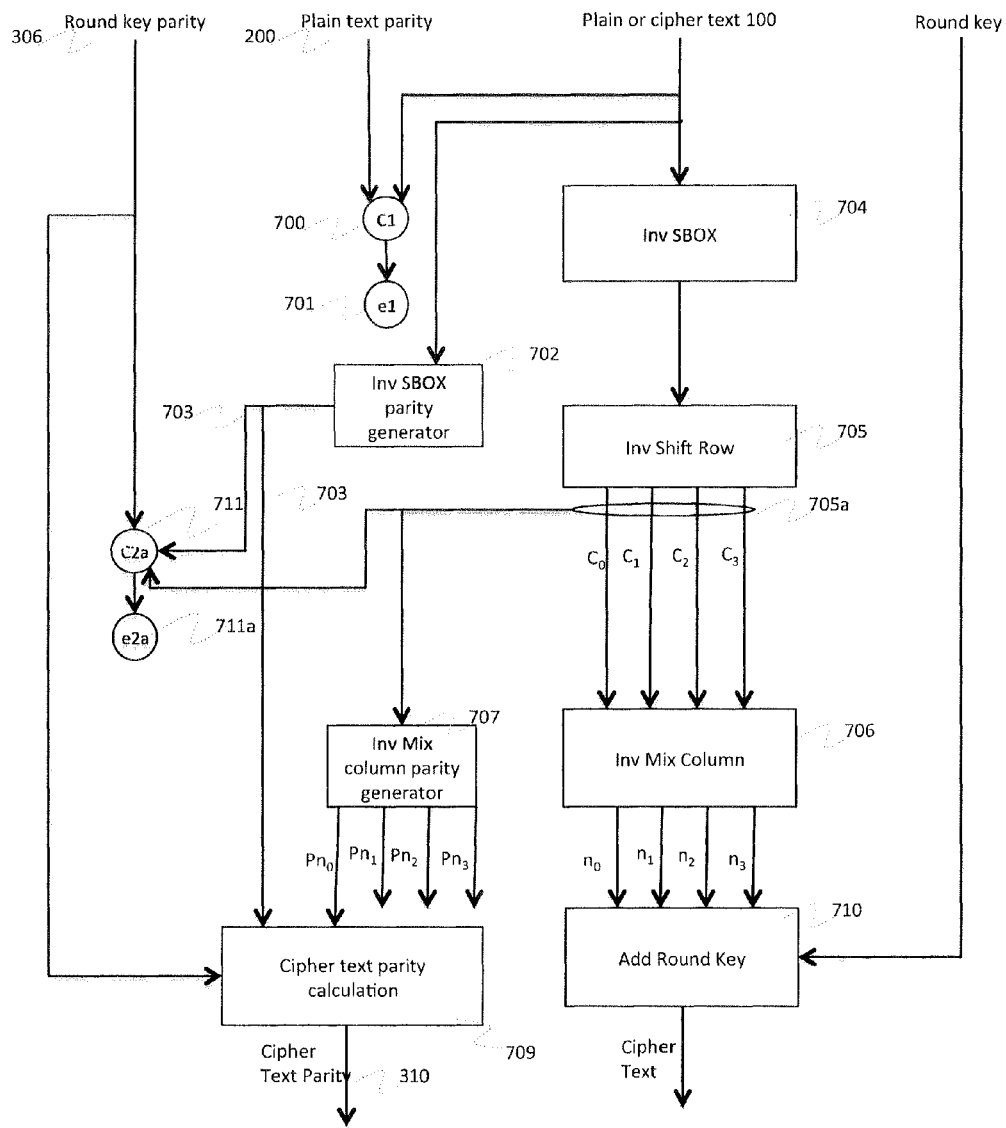
FIG. 7 is a simplified diagram showing addition of parities to a standard decryption process in order to detect errors occurring during said process.

FIG. 7 is a simplified flow diagram showing a decryption process. The parity computation is similar to that of FIG. 6, except for the mix column parity generator. For the decryption process, $$\begin{bmatrix} n_0 \\ n_1 \\ n_2 \\ n_3 \end{bmatrix} = \begin{bmatrix} 0E & 0B & 0D & 09 \\ 09 & 0E & 0B & 0D \\ 0D & 09 & 0E & 0B \\ 0B & 0D & 09 & 0E \end{bmatrix} \begin{bmatrix} C_0 \\ C_1 \\ C_2 \\ C_3 \end{bmatrix} \quad (3)$$

$$= \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} C_0 \\ C_1 \\ C_2 \\ C_3 \end{bmatrix} \oplus$$

$$\begin{bmatrix} 0C & 08 & 0C & 08 \\ 08 & 0C & 08 & 0C \\ 0C & 08 & 0C & 08 \\ 08 & 0C & 08 & 0C \end{bmatrix} \begin{bmatrix} C_0 \\ C_1 \\ C_2 \\ C_3 \end{bmatrix}$$

The parity of $[04]C=P_C\oplus c_7\oplus c_6$
The parity of $[08]C=P_C\oplus c_7\oplus c_6\oplus c_5$
And the parity of $[0C]C=$(parity of $[04]C)\oplus$(parity of $[08]C$)

Let:

$$\begin{bmatrix} q_0 \\ q_1 \\ q_2 \\ q_3 \end{bmatrix} = \begin{bmatrix} 0C & 08 & 0C & 08 \\ 08 & 0C & 08 & 0C \\ 0C & 08 & 0C & 08 \\ 08 & 0C & 08 & 0C \end{bmatrix} \begin{bmatrix} C_0 \\ C_1 \\ C_2 \\ C_3 \end{bmatrix}$$

Then equation (3) can be rewritten as $$\begin{bmatrix} n_0 \\ n_1 \\ n_2 \\ n_3 \end{bmatrix} = \begin{bmatrix} m_0 \\ m_1 \\ m_2 \\ m_3 \end{bmatrix} \oplus \begin{bmatrix} q_0 \\ q_1 \\ q_2 \\ q_3 \end{bmatrix}$$

Then:

$P_S=$parity of $[08]C_0\oplus$parity of $[08]C_2$
$P_T=$parity of $[08]C_1\oplus$parity of $[08]C_3$
$P_U=$parity of $[0C]C_0\oplus$parity of $[0C]C_2$
$P_V=$parity of $[0C]C_1$ parity of $[0C]C_3$
$P_S=P_{C0}\oplus P_{C2}\oplus C_{07}\oplus C_{06}\oplus C_{27}\oplus C_{26}\oplus P_U$
$P_T=P_{C1}\oplus P_{C3}\oplus C_{17}\oplus C_{16}\oplus C_{37}\oplus C_{36}\oplus P_V$
$P_U=C_{05}\oplus C_{25}$
$P_V=C_{15}\oplus C_{35}$ and $P_{q0}=P_S\oplus P_V$
$P_{q1}=P_T\oplus P_U$
$P_{q2}=P_S\oplus P_V$
$P_{q3}=P_T\oplus P_U$ then $P_{n0}=P_{m0}\oplus P_{q0}$
$P_{n1}=P_{m1}\oplus P_{q1}$
$P_{n2}=P_{m2}\oplus P_{q2}$
$P_{n3}=P_{m3}\oplus P_{q3}$ Thus for decryption, the inv S-box parity 703 is XOR 711 with the round key parity and with output value 705a of a standard inv shift-row operation 705 to detect an error 711a.

Figure 8A:
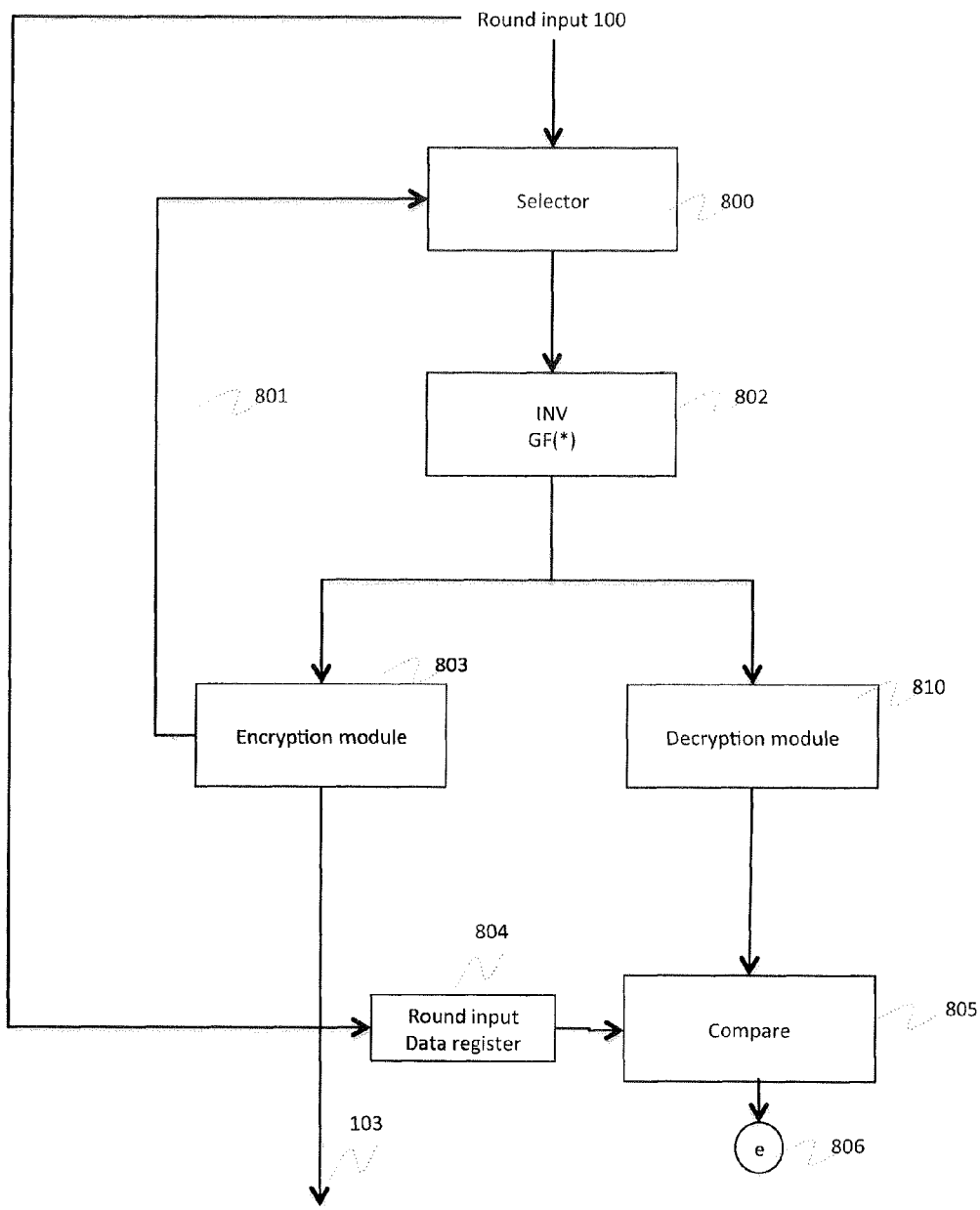
FIG. 8a is a simplified diagram showing an embodiment supporting multiplicative fault detection.

FIG. 8a shows a simplified block diagram of another embodiment for multiplicative fault detection. The process is applicable to a plurality of key sizes and to detecting many types of error in the ciphering process and key scheduling. The process relies on a common inverse function of $GF(2^8)$ 802 and uses the decryption path for error detection while encryption is in operation and the encryption path for error detection while decryption is in operation. Round input value n−1 100 is stored in a data register 804. After round input value n−1 is encrypted or partially encrypted by encryption module 803, round output value n−1 801 is fed to a selector 800. The selector transmits the round output value n−1 801 to the decryption module 810. The output value from the decryption module 810 is compared 805 to the round input value n−1 stored in the data register 804. When the two values are indicative of an error in the cipher process, as error is logged at 806. For example, when the output value from the decryption module 810 and the round input value n−1 stored in the data register 804 are other than identical an error is logged at 806. In the next cycle, the selector takes the round input value n for transmission to the encryption module 803 and then proceeds to alternate between encryption of the round input value and decryption of the round output value to allow for comparison to enable error detection in the encryption process.

Though the process shown relates to a round, it is evident that so long as the process portion is reversible, error detection is performable on any subset of operations within an encryption process by relying on a method such as that of FIG. 8.

Figure 9:
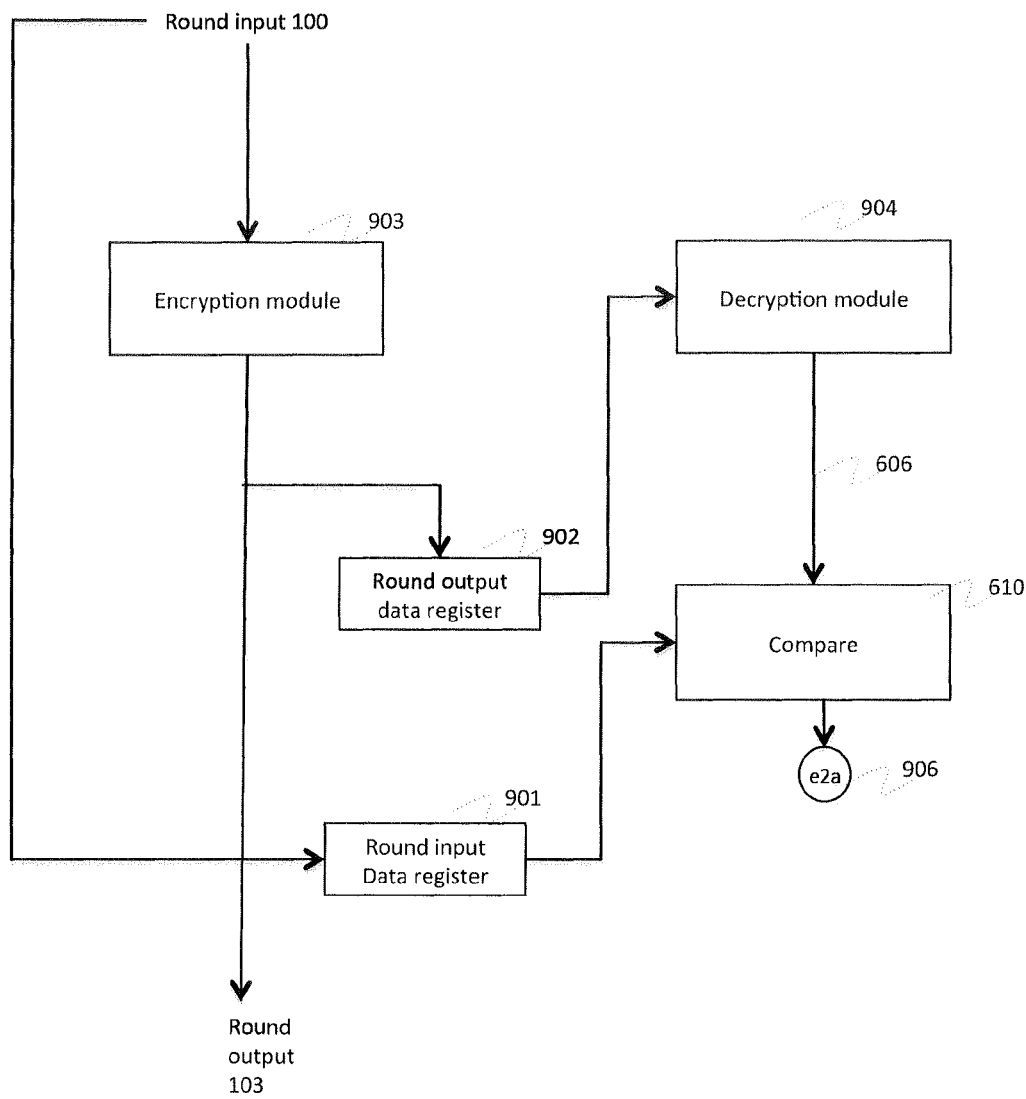
FIG. 9 is a simplified diagram showing an embodiment for fault detection in high-speed applications.

FIG. 9 shows a simplified block diagram of another embodiment for fault detection in high speed applications. The process is applicable to a plurality of key sizes and to detecting many types of error in the ciphering process and key scheduling. The process relies on the decryption path for error detection while encryption is in operation and the encryption path for error detection while decryption is in operation. Round input value n−1 100 is stored in a data register 901, and after round input value n−1 is encrypted or partially encrypted by encryption module 903, round output value n−1 103 is stored in a data register 902, which is decrypted by the decryption module 904. The output value from the decryption module 606 is compared to the round input value n−1 stored in the data register 901, when the two values indicate an error in ciphering, for example the two values are other than identical, an error is logged at 906.

Though the process shown relates to a round, it is evident that so long as the process portion is reversible, error detection is performable on any subset of operations within an encryption process by relying on a method such as that of FIG. 9.

Although the processes described above including those with reference to the foregoing block diagrams have been described separately, two or more of the processes disclosed herein can be combined to form a combined process. The processes described herein are implementable by storing operations and/or descriptions in machine readable form for, when executed, resulting in such a process.

Further, the processes described herein are implementable in software or in hardware. In hardware implementations, the processes are embodied within an apparatus supporting the hereindescribed processes. Yet further, the processes described herein are implementable by storing operations and/or descriptions in machine readable form for, when executed, resulting in such an apparatus. Any of the methods, processes, implementations, or procedures described herein optionally include machine-readable instructions for execution by: (a) a processor, (b) a controller, and/or (c) any other suitable processing device. Any process, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart or block diagram depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of some blocks may be changed, and/or some of the blocks described may be changed, eliminated, or combined.

It should be noted that the processes illustrated and discussed herein have various modules for performing particular functions and for interacting with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination. Further, optimization of some processes may result in blocks being combined or functions being rearranged across different blocks or in a different architecture.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method comprising:
   providing data for ciphering thereof; and;
   ciphering the data in a plurality of cipher rounds, each round comprising:
   determining an encoding for error detection of data for being processed within the round,
   determining an output error detection encoding for the round,
   processing the data for being processed within the round to provide output error detection encoding,
   verifying the output error detection encoding against the determined output error detection encoding, and
   when the output error detection encoding is other than same as the determined error detection encoding, providing a signal indicative of an error within the cipher process.

2. A method according to claim 1 comprising:
   logging at least one of a presence of an error and an absence of an error during a round of the cipher process.

3. A method according to claim 2 comprising:
   when an error is detected, repeating the cipher process.

4. A method according to claim 1 comprising:
   when an error is detected, repeating the round in which the error is detected.

5. A method according to claim 1 wherein error detection encoding comprises at least a parity symbol.

6. A method according to claim 5 wherein the at least a parity symbol comprises a multi-bit parity code.

7. A method according to claim 5 wherein the at least a parity symbol comprises a mix column parity.

8. A method according to claim 5 wherein the at least a parity symbol comprises a checksum.

9. A method according to claim 5 wherein the at least a parity symbol comprises an S-box parity.

10. A method according to claim 1 wherein the output error detection encoding is determined by determining at least a parity symbol relating to output data from processing the data for being processed within the round.

11. A method comprising:
    providing first data for ciphering thereof;
    performing a ciphering process on the first data, the ciphering process comprising a plurality of intermediate steps;
    calculating at least one parity symbol for at least one intermediate step;
    based on the calculated at least one parity symbol, verifying an output value of the at least one intermediate step to detect an error within the output value;
    repeating the at least one intermediate step until an error within the output value is other than detected; and
    when an error is detected within the output value relating to an intermediate step, repeating the ciphering process.

12. A method according to claim 11 comprising:
    repeating the ciphering process until an error within the output value is other than detected.

13. A method according to claim 11 comprising:
    logging each detected error within an error log file.

14. A method according to claim 13 comprising:
    when the log file is indicative of a detected error within an output value relating to an intermediate step, repeating the ciphering process.

15. A method according to claim 11 comprising:
calculating at least one other parity symbol for at least one other intermediate step; and
based on the calculated at least one other parity symbol, verifying a second output value of the at least one other intermediate step to detect an error within the second output value.

16. A method according to claim 11 wherein calculating at least one parity symbol for at least one intermediate step comprises, calculating at least one parity symbol for each intermediate step within the ciphering process; and wherein verifying comprises verifying an output value of each intermediate step to detect an error within said output value.

17. A method according to claim 11 wherein the at least a parity symbol comprises a multi-bit parity code.

18. A method according to claim 17 wherein the multi-bit parity code supports error detection and error correction comprising:
automatically correcting an error in the output value based on the multi-bit parity and the output value.

19. A method according to claim 11 wherein the at least a parity symbol comprises a mix column parity.

20. A method according to claim 11 wherein the at least a parity symbol comprises a checksum.

21. A method according to claim 11 wherein the at least a parity symbol comprises an S-box parity.

22. A method comprising:
providing external data for ciphering thereof;
performing a ciphering process on the external data, the ciphering process comprising a plurality of intermediate steps comprising:
providing first data for processing;
calculating a result of performing an intermediate step on the first data;
performing an inverse function on the result of the intermediate step; and
comparing a result of the inverse function to the first data to detect an error in processing of the first data; and
when the first data and the result of the inverse function are indicative of an error, performing one of logging the error and repeating calculating a result of performing the intermediate step on the first data.

23. A method according to claim 22 wherein comparing is performed by comparing at least a parity symbol derived based on the first data and at least a parity symbol based on the result of the inverse function.

24. A method according to claim 22 wherein performing a ciphering process on the external data comprises: providing second data for processing, the second data a result of the intermediate step performed on the first data:
calculating a result of performing a second intermediate step on the second data;
performing a second inverse function on the result of the second intermediate step; and
comparing a result of the second inverse function to the second data to detect an error in processing of the second data; and
when the second data and the result of the second inverse function are indicative of an error, performing one of logging the error and repeating calculating a result of performing the second intermediate step on the second data.

25. A method comprising:
providing first data for ciphering thereof;
performing a ciphering process on the first data, the ciphering process comprising a plurality of intermediate steps;
calculating at least one error detection and correction code for at least one intermediate step; and
based on the calculated at least one error detection and correction code, verifying an output value of the at least one intermediate step to correct an error within the output value, the error corrected solely in dependence upon the output value and the error detection and correction code.

26. A method according to claim 25 wherein the at least one error detection and correction code comprises a multi-bit parity code.

27. A method according to claim 25 wherein the at least one error detection and correction code comprises a mix column parity.

28. A method according to claim 25 wherein the at least one error detection and correction code comprises a checksum.

29. A method according to claim 25 wherein the at least one error detection and correction code comprises an S-box parity.

30. A method according to claim 25 wherein the at least one error detection and correction code comprises one of a turbocode and a hypercode.

* * * * *